US005600561A

United States Patent [19]
Okamura

[11] Patent Number: 5,600,561
[45] Date of Patent: Feb. 4, 1997

[54] VEHICLE DISTANCE DATA PROCESSOR

[75] Inventor: Shigekazu Okamura, Himeji, Japan

[73] Assignee: Mitsubishi Denki Kabushiki Kaisha, Tokyo, Japan

[21] Appl. No.: 385,882

[22] Filed: Feb. 9, 1995

[30] Foreign Application Priority Data

Feb. 10, 1994 [JP] Japan .................................. 6-016734

[51] Int. Cl.⁶ ........................ G01S 13/42; G01S 13/60; G01S 17/66
[52] U.S. Cl. ...................... 364/460; 340/903; 356/4.07
[58] Field of Search .................... 364/460, 461; 180/167, 168, 169; 342/70, 71, 72, 107, 109, 114, 118, 145; 340/903, 904; 356/3, 4.01, 4.07

[56] References Cited

U.S. PATENT DOCUMENTS

| | | | |
|---|---|---|---|
| 4,757,450 | 7/1988 | Etoh | 364/426 |
| 4,786,164 | 11/1988 | Kawata | 356/4 |
| 4,926,170 | 5/1990 | Beggs et al. | 340/904 |
| 5,249,157 | 9/1993 | Taylor | 340/903 |
| 5,291,207 | 3/1994 | Kikuchi et al. | 342/70 |
| 5,321,407 | 6/1994 | Kikuchi et al. | 342/70 |
| 5,453,740 | 9/1995 | Gallagher et al. | 340/903 |

FOREIGN PATENT DOCUMENTS 61-20877  1/1986  Japan .
259186  11/1986  Japan .

*Primary Examiner*—Michael Zanelli
*Attorney, Agent, or Firm*—Sughrue, Mion, Zinn, Macpeak & Seas

[57]  ABSTRACT

A vehicle distance data processor precisely correlates or matches points of detection in a time serial manner to thereby accurately determine distances of a subject vehicle to a plurality of other vehicles or obstacles lying ahead as well as relative velocity vector data indicative of a velocity vector of each of the other vehicles or obstacles relative to the subject vehicle. Currently obtained coordinate data is correlated or matched with previously obtained coordinate data by means of a matching element 5A on the basis of coordinate data obtained by a distance data converting element 3A, reflection strength data obtained by a distance data/reflection-strength data input element 2A, and predicted coordinate data obtained by a coordinate data predicting element 4A.

6 Claims, 7 Drawing Sheets

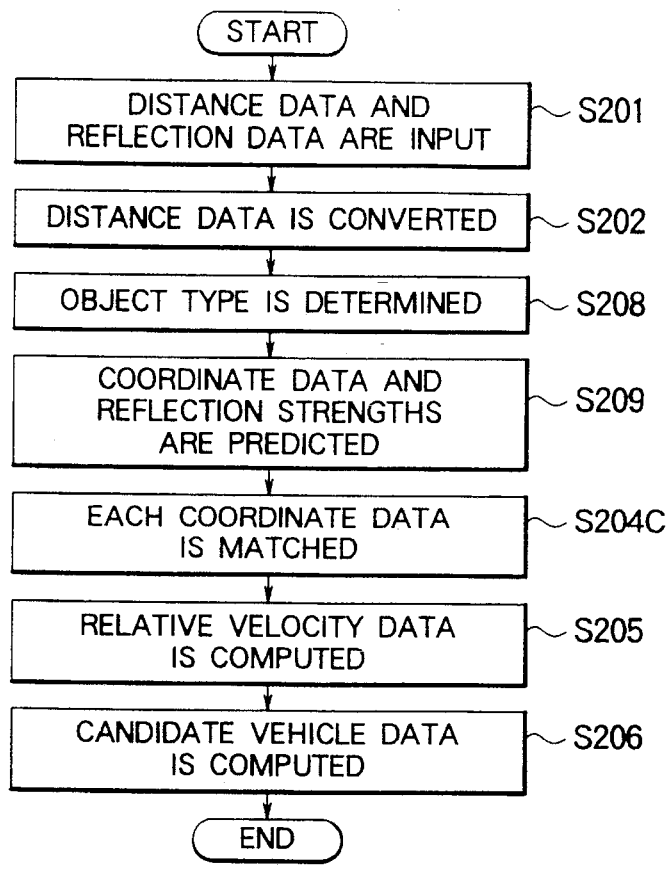
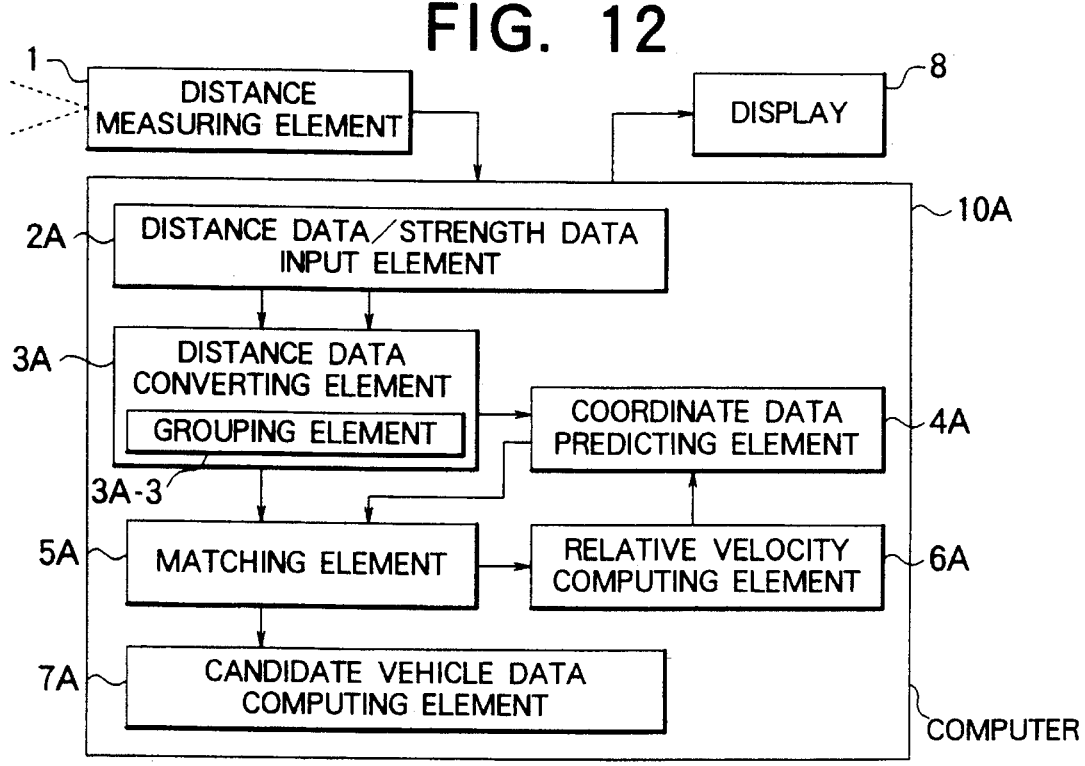

VEHICLE DISTANCE DATA PROCESSOR

BACKGROUND OF THE INVENTION

1. Field of the Invention

The present invention relates to a vehicle distance data processor for matching objects having the same time series when measuring the distance of a vehicle to another vehicle or obstacle ahead, and a relative velocity therebetween.

2. Description of the Related Art

In a vehicle-to-vehicle distance alarm device which generates an alarm when a vehicle having the alarm device mounted thereon (hereinafter referred to as a subject vehicle) comes within a dangerous distance to another vehicle ahead (hereinafter referred to as a preceding vehicle), the velocity of the subject vehicle relative to the preceding vehicle must also be measured in addition to the distance therebetween. However, when a distance measuring means similar to a scanning-type distance measuring device having a plurality of distance measurement areas is used with the above-described vehicle-to-vehicle distance alarm device, a problem arises as to which successive distance data to choose among the plurality of distance data, measured at a fixed time interval, to obtain the relative velocity. In order to overcome such a problem, there has been conventionally proposed a vehicle distance data processor such as that disclosed, for example, in Japanese Patent Publication No. 3-6472, in which a difference between the previous and current distances is determined for each direction of detection to obtain the relative velocity. In such a prior art device, however, when an object to be detected is moving sideways so that it moves into an area of detection just next to the current one, it might not be possible to continuously provide correct relative velocity data because the sidewise movement cannot be detected.

Accordingly, if the successively detected points are correlated or matched in time series to each other (i.e., currently detected points are correlated or matched to the lastly detected points), the relative velocity can be computed even for objects which have moved sideways. To this end, although not known to public, a vehicle distance data processor having, for example, a structure as that illustrated in FIG. 13 may be considered.

As apparent from FIG. 13, the vehicle distance data processor includes a distance measuring element 1 for measuring the distance from a subject vehicle to another vehicle or obstacle ahead and generating a corresponding output; a distance data input element 2 for inputting the output of the distance measuring element 1 into a computer 10; a distance data converting element 3 for converting distance data input by the distance data input element 2 to coordinate data in the form of two-dimensional coordinate data; a coordinate data predicting element 4 for predicting coordinate data to be obtained from the current measurement (to be described later) based on the previous coordinate data which is obtained through conversion of the previously measured distance data by means of the distance data converting element 3; a correlating element 5 for correlating the currently obtained coordinate data with the previously obtained coordinate data based on the coordinate data predicted by the coordinate data predicting element 4; a relative velocity computing element 6 for computing relative velocity data related to each detection point based on the previously and currently measured coordinate data correlated or matched by the correlating element 5; a candidate or predicted vehicle data computing element 7 for obtaining candidate or predicted vehicle data from the currently obtained coordinate data or relative velocities detected; and a display 8 for displaying this result.

FIG. 14 is a flowchart illustrating processing of data carried out by the above-described vehicle distance data processor. The flowchart of such data processing will be described below, in Step 101, distance data obtained, for example, by the distance measuring element 1 similar to a scanning-type distance meter using a laser beam is input via distance data input element 2 to the computer 10. In Step 102, the input data is converted to corresponding two-dimensional coordinate data by the distance data converting element 3. Then in Step 103, the current coordinates of each of the detected points are predicted by the coordinate data predicting element 4 based on the x and y coordinates of the past detected points and relative velocity vector data. In Step 104, the correlating element 5 compares the coordinate data predicted in Step 103 with the currently obtained coordinate data for each detected point, so that the predicted coordinate data is correlated or matched to the currently obtained coordinate data if they are determined to be identical, i.e., if they satisfy the following Relationships (1) and (2);

$$|Xi-Xj| \leq X \quad (1)$$

$$|Yi-Yj| \leq Y \quad (2)$$

where i represents a coordinate of a currently detected point, and j represents a coordinate of a predicted detection point.

In Step 105, based on changes in the previous and current coordinates which were correlated or matched in Step 104, a relative velocity vector is obtained by the relative velocity computing element 6. Then, in Step 106, the detection points or points to be detected are computed to obtain predicted vehicle data by the predicted vehicle data computing element 7 to provide the coordinate data and a relative velocity vector thereof. The display 8 generates an alarm based on the coordinate data and the relative velocity vector data for the predicted vehicle data obtained in this manner.

However, in the above-described device, problems occur when the coordinate data and relative velocity vector data, required to obtain the predicted position, are not accurate. For example, when x and y coordinates in Formulas (1) and (2) above are made small, corresponding coordinates cannot be found so that successive variations in distance cannot be obtained. That is, a new candidate vehicle data appears each time the distance is measured. On the other hand, when x and y coordinates are made large, a plurality of corresponding coordinates appear so that an error may occur depending on the way of correlation of the coordinate data. Thus, coordinates and relative velocity vector data different from those of the actual candidate vehicle data result, generating a false alarm.

SUMMARY OF THE INVENTION

In view of the above-described problems, the invention aims at providing a vehicle distance data processor in which additional information regarding the strength of the reflected electromagnetic waves is used along with the predicted positions obtained from the aforementioned formulas (1) and (2) to match the detection points having the same time series without error, whereby accurate measurements can be made of the distance between one's vehicle and a plurality of vehicles ahead or obstacles ahead and the relative velocity vector data.

According to the present invention, there is provided a vehicle distance data processor comprising:

distance measuring means which generates electromagnetic waves in a plurality of directions and receives electromagnetic waves reflected from objects to provide reflection strength data regarding the strengths of the reflected electromagnetic waves and distances to the objects;

distance data converting means for converting distance data obtained by the distance measuring means into coordinate data of the positions of the points of detection;

predicting means for predicting coordinate data of each currently obtained detection point based on the coordinate data of each previously obtained detection point and relative velocity vector data related to each detection point;

matching means for matching each previously obtained detection point and each currently obtained detection point in a time serial manner, based on the predicted coordinate data obtained by the predicting means, the strength of the reflected electromagnetic waves of each previously obtained detection point, and the coordinate data of each currently obtained detection point and the strength of reflected electromagnetic waves thereat;

relative velocity computing means which computes the relative velocity vector data based on the detection points which have been matched with their respective points by the matching means, with the computed relative velocity vector data being used in the predicting means; and candidate vehicle data computing means for obtaining the candidate vehicle data by computation of currently obtained detection point based on the aforementioned coordinate data, and relative velocity vector data to obtain coordinate data and velocity vector data thereof.

With this arrangement, mismatching occurs less frequently because the coordinate data and strengths of reflection can be used to match a previously obtained coordinate data with a currently obtained coordinate data.

In a preferred form of the invention, the vehicle distance data processor further comprises reflection strength order determining means for ordering the detection points based on the strengths of reflected electromagnetic waves obtained by the distance measuring means. The matching means matches each previously obtained detection point and each currently obtained detection point in a time serial manner, based on the predicted coordinate data predicted from each previously obtained detection point, the strength of reflected electromagnetic waves at each previously obtained detection point, and the order of the detection points arranged according to the reflection strengths thereof, the coordinate data of each currently obtained detection point, the strength of reflected electromagnetic waves at each currently obtained detection point, and the order of the detection points according to the reflection strengths thereof.

With this arrangement, coordination of data is performed in the order from high to low strength of the received electromagnetic wave, thus reducing the possibility of mismatching of data arranged in different time series.

In another preferred form of the invention, the vehicle distance data processor further comprises object determining means for determining the type of an object at each detection point based on distance data of a distance to each of the detection points and reflection strengths obtained by the distance measuring means. The matching means matches each currently obtained detection point and each previously obtained detection point in a time serial manner, based on the predicted coordinate data predicted from each previously obtained detection point, results of previous determinations obtained by the object determining means, coordinate data of each currently obtained detection point, and current determinations obtained by the object determining means.

With this arrangement, matching of objects having a different time series will occur less frequently because the type of object is determined from the relationship between distance and reflection strength, so that objects having the same relationship will be matched.

In a further preferred form of the invention, the vehicle distance data processor further comprises strength predicting means for predicting the strength of reflected electromagnetic waves at each currently obtained detection point, based on the strength of reflected electromagnetic waves at each currently obtained detection point and relative velocity vector data related to each detection point. The matching means matches each previously obtained detection point and each currently obtained detection point in a time serial manner, based on the predicted coordinate data predicted from each previously obtained detection point, the predicted strength of reflected electromagnetic waves obtained by the reflection strength predicting means, the coordinate data of each currently obtained detection point, and the reflection strengths thereat.

With this arrangement, the strengths of reflected electromagnetic waves are also predicted in addition to the coordinate data, so that matching of objects having different time series will occur less frequently.

In a further preferred form of the invention, the vehicle distance data processor further comprises grouping means which arranges coordinate data into groups of closely located detection points to obtain representative coordinate data and a representative strength of reflected magnetic waves of the group, wherein the representative coordinate data and the representative strength of reflection are used as the coordinate data and the reflection strength, respectively, of each detection point.

With this arrangement, since the detection points are grouped together before they are processed, there is less data to be handled, thus improving the speed of processing.

The above and other objects, features and advantages of the present invention will become apparent from the following detailed description of preferred embodiments of the invention when taken in conjunction with the accompanying drawings.

BRIEF DESCRIPTION OF THE DRAWINGS

FIG. 11 is a flowchart illustrating processing of data in the fourth embodiment;

FIG. 12 is a black diagram of a vehicle distance data processor of a fifth embodiment of the invention;

DESCRIPTION OF THE PREFERRED EMBODIMENTS

Embodiments of the present invention will now be described in detail while referring to the accompanying drawings.

FIRST EMBODIMENT

Figure 1:
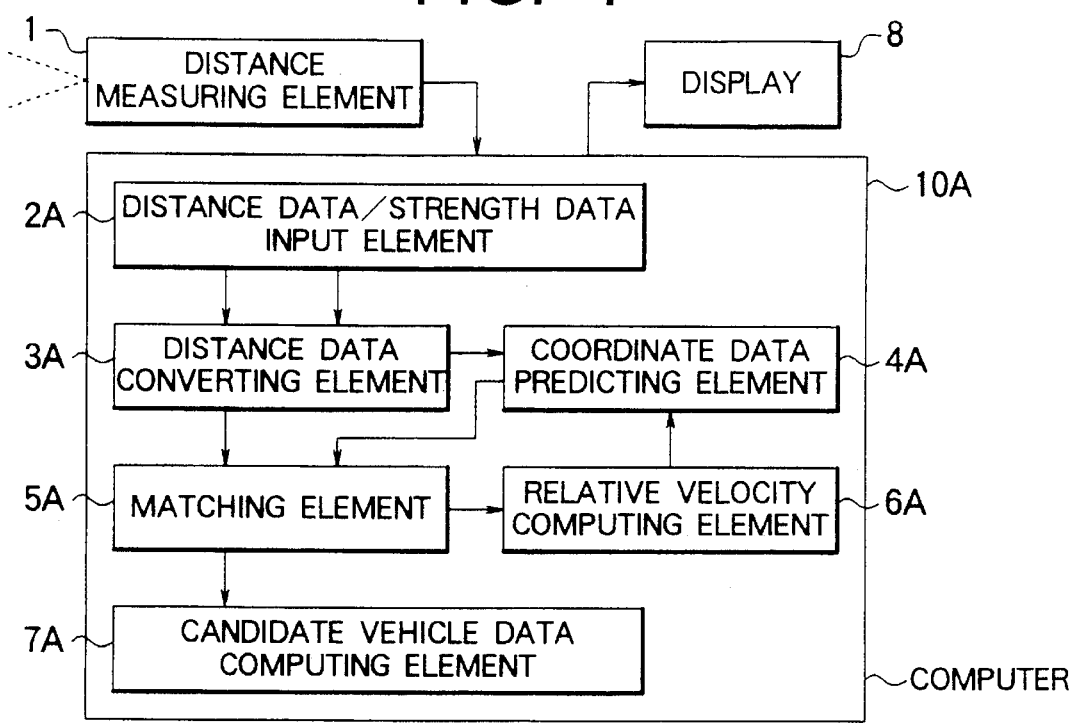
FIG. 1 is a block diagram of a vehicle distance data processor according to the invention.

FIG. 1 is a block diagram illustrating a vehicle distance data processor in accordance with a first embodiment of the present invention. As is apparent from FIG. 1, the vehicle data processor includes a distance measuring element 1 for measuring a distance from a vehicle equipped with the vehicle distance data processor (hereinafter referred to as a subject vehicle) to another vehicle or an obstacle ahead and generating a corresponding output, a distance data/reflection-strength data input element 2A for inputting the output of the distance measuring element 1 into a computer 10A; a distance data converting element 3a for converting the distance data input by the distance data/reflection-strength data input element 2A into corresponding coordinate data which is two dimensional coordinate data; a coordinate data predicting element 4A for predicting coordinate data to be obtained from the current measurement (as described below) based on the coordinate data of the previous measurement converted by the distance data converting element 3A; a matching element 5A for correlating or matching the currently obtained coordinate data with the previously obtained coordinate data based on the predicted coordinate data obtained by the coordinate data predicting element 4A; a relative velocity computing element 6A for computing the relative velocity of each detected point from the previously obtained coordinate data correlated or matched with the currently obtained coordinate data by the correlating or matching element 5A; a candidate vehicle data computing element 7A for computing candidate vehicle data from such data as current coordinate data and relative velocity; and a display 8 for displaying the results of the data processing.

Figure 2:
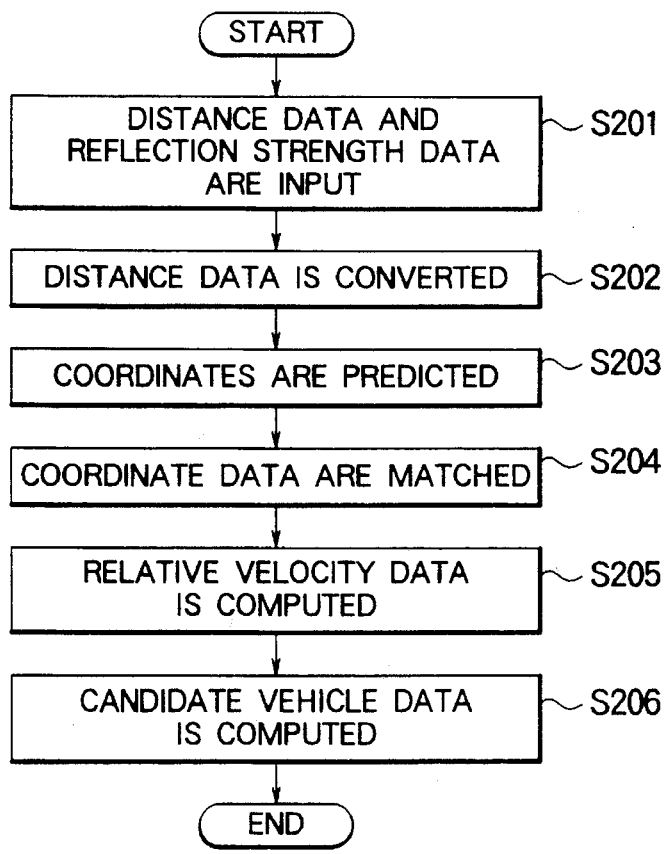
FIG. 2 is a flowchart of processing of data in a first embodiment of the invention.
Figure 3:
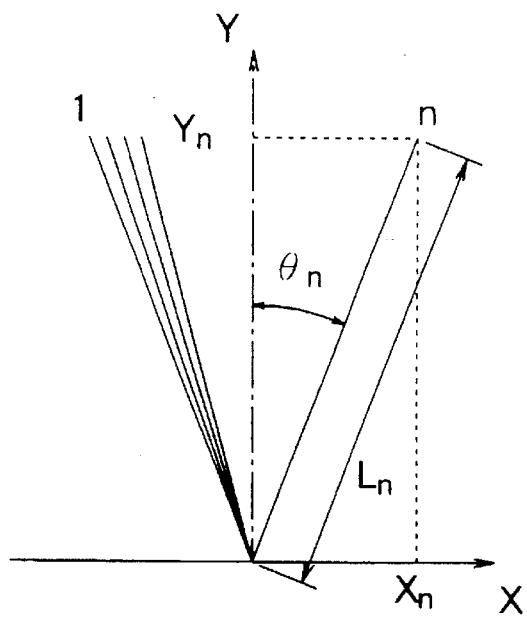
FIG. 3 illustrates an area for distance measurement carried out by a scanning-type distance meter.

Steps for processing distance data in this embodiment are illustrated in a flowchart of FIG. 2. First, it is to be noted that, as shown in FIG. 3, the distance measuring element used in this embodiment is a scanning-type distance meter which generates a laser beam scanning in the horizontal direction while changing the direction of scanning n number of times. The area of distance measurement is also shown in FIG. 3.

A description will be made below of the steps for processing distance data in this embodiment while referring to the flowchart of FIG. 2.

In Step S201, a plurality of distance data and reflection strength data regarding the strength of reflected electromagnetic waves (hereinafter simply referred to as reflection strength) corresponding to each distance data obtained by the scanning-type distance meter used in the distance measuring element 1 are input into the distance data/reflection-strength data input element 2A for each direction of scanning. In Step S202, each distance data is converted to two-dimensional coordinate data by the distance data converting element 3A from an angle of scanning direction in accordance with the following Equations (3) and (4):

$$Xni = Lni \sin \theta ni \quad (3)$$

$$Yni = Lni \cos \theta ni \quad (4)$$

where $Lni$ is an i-th distance data, $\theta ni$ is the angle of emission of an i-th beam, $Xni$ is the X coordinate based on an i-th distance data, and $Yni$ is the Y coordinate of the i-th distance data.

In Step S203, the current coordinate data is predicted from the following Equations (5) and (6) based on the previously obtained coordinate data and the relative velocity vector data;

$$Xpni = Xn{-}1i + Vxn{-}1i \times T \quad (5)$$

$$Ypni = Yn{-}1i + Vyn{-}1i \times T \quad (6)$$

where $Xpni$ and $Ypni$ are the predicted x and y coordinates of a first data to be obtained from the current measurement; $Xn{-}1i$ and $Yn{-}1i$ are the x and y coordinates of a first data obtained from the previous measurement; $Vxn{-}1i$ and $Vyn{-}1i$ are the relative velocity vector data obtained from the results of the previous measurement; and T is the period of computation.

It is to be noted that in the previous prediction, a predetermined value is used for the relative velocity vector data.

Figure 4:
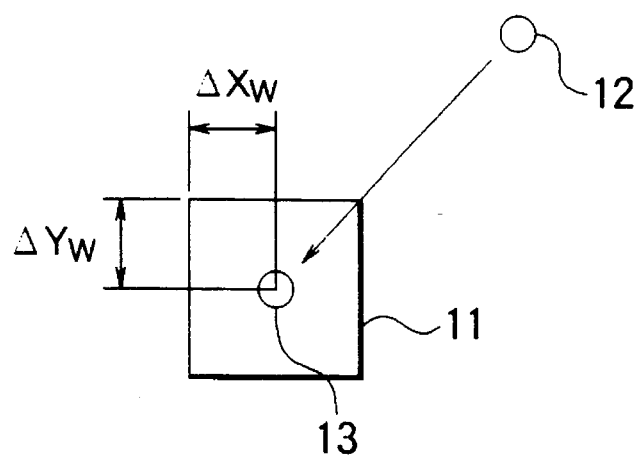
FIG. 4 illustrates a box enclosing this area.

In Step S204, the predicted coordinates of detected points previously obtained in Step S203 are correlated or matched with the coordinates of the currently detected points obtained by the current measurement. More specifically, as shown in FIG. 4, an area including the predicted coordinates of an i-th point of detection is first set or defined as a box 11 with its area given by the following Equations (7), (8), (9) and (10). In FIG. 4, reference numeral 12 denotes a previously obtained point of detection, and reference numeral 13 denotes a predicted position (a predicted position of the current point of detection).

$$XwRi = Xpni + Xw \quad (7)$$

$$XwLi = Xpni - Xw \quad (8)$$

$$YwFi = Ypni + Yw \quad (9)$$

$$YwNi = Ypni - Yw \quad (10)$$

Figure 5:
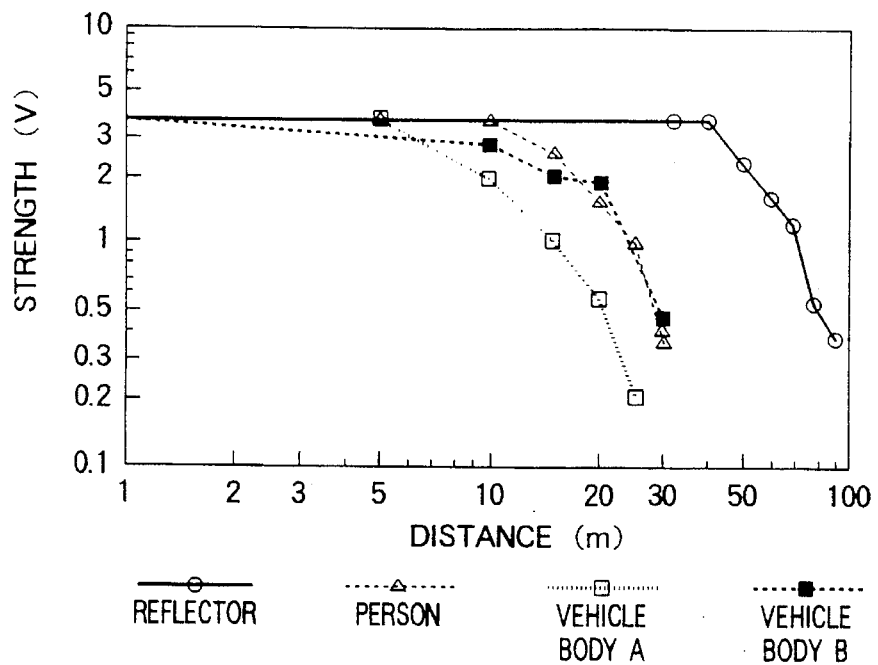
FIG. 5 illustrates the relationship between distance and strength of reflection.

Then, the current point of detection j, which is inside the box 11 enclosing the predicted position of the current point of detection 13, is searched. When there is only one currently obtained point of detection included in the box 11, a determination is made that the vehicle or obstacle ahead has moved from the previous point of detection i to the current point of detection j. When there are a plurality or points of detection inside the box 11, as shown in FIG. 5, it is utilized the fact that the smaller the distance to an object, the stronger is the reflection strength of light from the object. That is, when there are points of detection among those inside the box 11 in which the previously obtained relative velocity $Vyn{-}1i$ of each point of detection is negative (i.e., each of the points of detection is approaching the object), a point of detection in which the currently obtained reflection strength $Pn-lj$ is larger than the previously obtained reflection strength $Pn-li$ is chosen. On the other hand, when $Vyn-li$ is positive (i.e., points of detection are going away from an object to be detected), points of detection in which the currently obtained reflection strength $Pn\ lj$ is smaller than the previously obtained reflection strength $Pn-li$ is chosen. Then, those having the reflection strength values which are the closest to the values of the previously obtained reflection strength are determined as corresponding points of detection. Further, corresponding i and j values are combined and stored.

If a point of detection corresponding to the current point of detection has been found among the previously obtained points of detection, the previous and current coordinate data and reflection strengths are stored as successive data, whereas if otherwise, storage is not performed. On the other hand, if a previous point of detection cannot be found among the present points of detection, the current coordinate data and reflection strengths are stored as new data.

In Step S205, relative velocity data related to each point of detection is computed from the following Equations (11) and (12) based on the correlated or matched coordinate data stored in Step S204.

$$Vxni=(Xni-Xn-li)/T \quad (11)$$

$$Vyni=(Yni-Yn-li)/T \quad (12)$$

Here, it is to be noted that when new data is used, $Vxni$ and $Vyni$ are both zero because there is no previous coordinate data.

In Step S206, points of detection in the Y coordinate are taken in the order closer to the object. Measurements are made of relative velocity data related to the point of detection being dealt with, which is in the center of the area defined by the X and Y coordinates. Those at which the relative velocity data lie within Vx and Vy are brought together to form candidate vehicle data. Then, the points of detection of the X and Y coordinates and the average values of the relative velocity vector data Vx and Vy are obtained to form candidate vehicle coordinate data and relative velocity vector data, respectively.

As described above, according to the first embodiment, the coordinates which are detected in time series are correlated or matched using coordinate data as well as reflection strength data, so that mismatching occurs less frequently, thus resulting in more reliable vehicle-to-vehicle distance control.

SECOND EMBODIMENT

Figure 6:
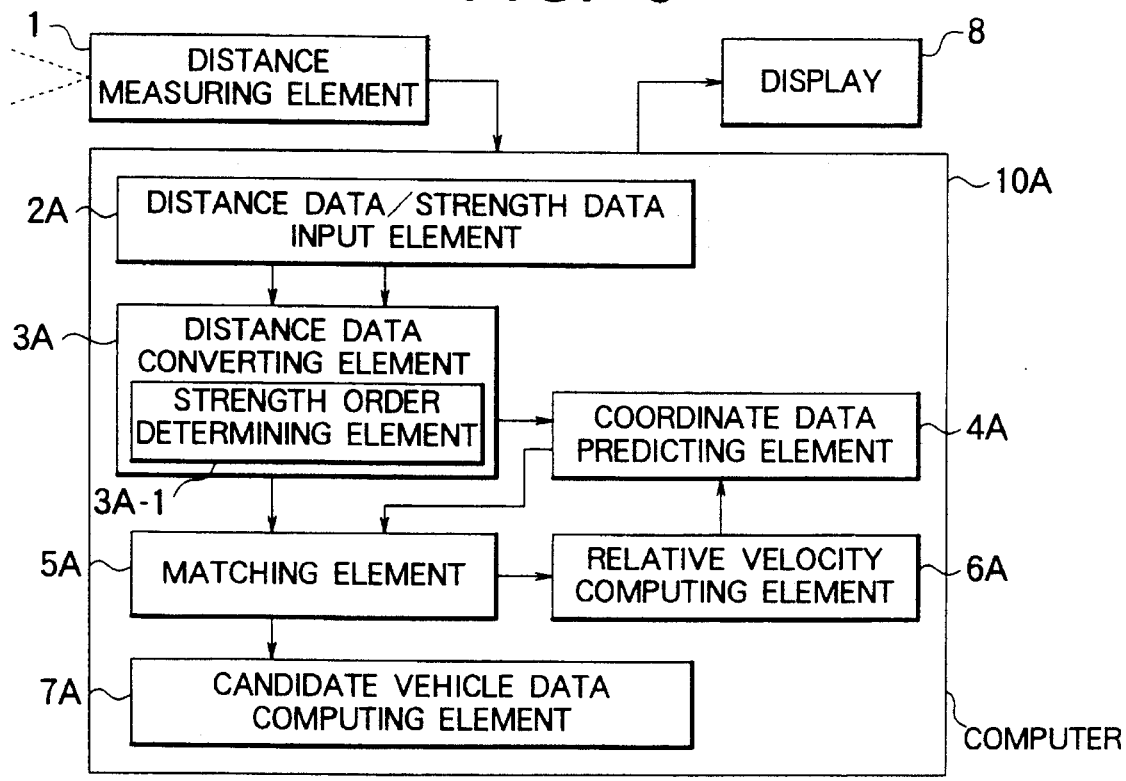
FIG. 6 is a block diagram of a vehicle distance data processor of a second embodiment of the invention.
Figure 7:
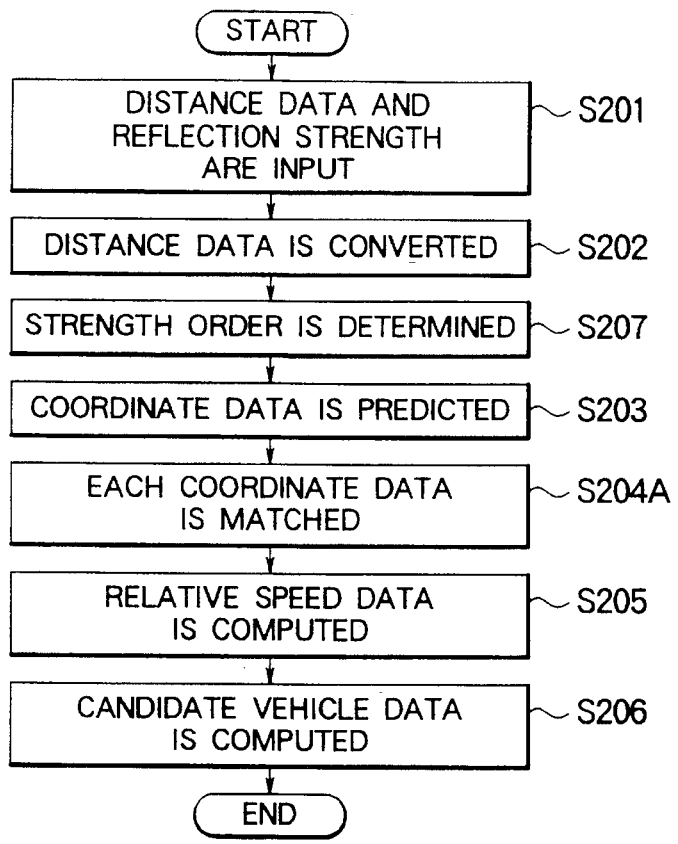
FIG. 7 is a flowchart illustrate processing of data in the second embodiment.

FIG. 6 illustrates a vehicle distance data processor constructed in accordance with a second embodiment of the present invention, which is substantially similar in construction and operation to the first embodiment of FIG. 1, except for the provision or a reflection strength order determining element 3A-1 which puts points of detection in order in accordance with the strengths of the reflected electromagnetic waves obtained by the distance measuring element. A flowchart for the steps of processing distance data in the second embodiment is illustrated in FIG. 7. In this figure, the same distance data processing steps as those in FIG. 2 are designated at the same symbols as those in FIG. 2, so a description of these steps will be omitted. The processing of FIG. 7 involves the following additions and changes made in relation to the processing of the first embodiment.

Provided between Steps S202 and S203 is an additional Step S207 in which a determination is made as to the ordering or arrangement of the points of detection according to the reflection strength. Such a determination is made by the reflection strength order determining element 3A-1 which is incorporated in the distance data converting element 3A. In Step S207, the current points of detection are compared with corresponding strengths of reflected electromagnetic waves, ordered and stored according to the strengths of the reflected electromagnetic waves.

In the process of correlating or matching coordinates, the predicted coordinates and the reflection strengths were utilized in the first embodiment. In the second embodiment, however, the points of detection ordered according to the reflection strengths in Step S207 is additionally utilized. That is, a current point of detection inside the box 11 is searched in the order from the highest to the lowest reflection strength. When there are more than one point of detection inside the same box 11, those of higher reflection strengths are chosen first and correlated or matched with the previous points of detection. Then, the i and j coordinate combination is stored. The rest of the processing steps are the same as those described in the first embodiment.

According to the second embodiment, those of higher reflection strengths, for example points of detection obtained in time series by means of, for example, a reflector are correlated or matched with a current point of detection, so that mismatching thereof will occur less frequently. The frequency at which mismatching is prevented depends on how much information is available regarding the ordered detection points according to the strengths of the reflected electromagnetic waves. For example, them will be no mismatching between detection points where reflectors are present and detection points where objects other than reflectors are present, thus resulting in more reliable vehicle-to-vehicle distance control.

THIRD EMBODIMENT

Figure 8:
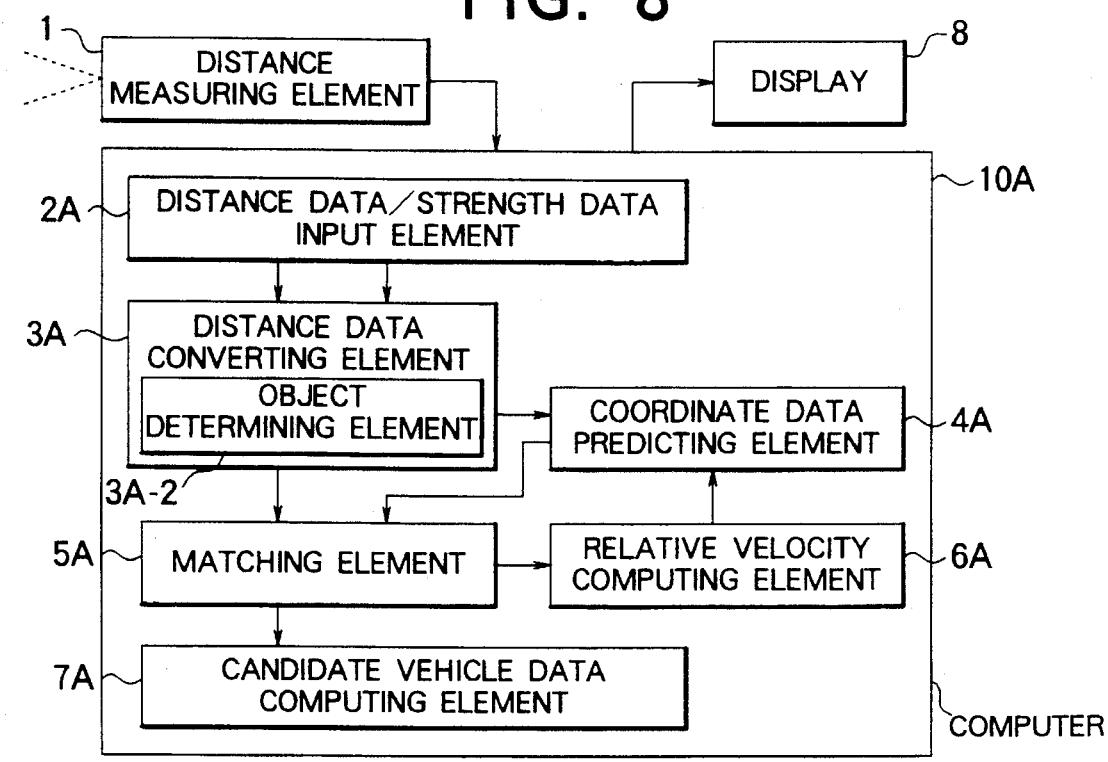
FIG. 8 is a block diagram of a vehicle distance data processor of a third embodiment of the invention.
Figure 9:
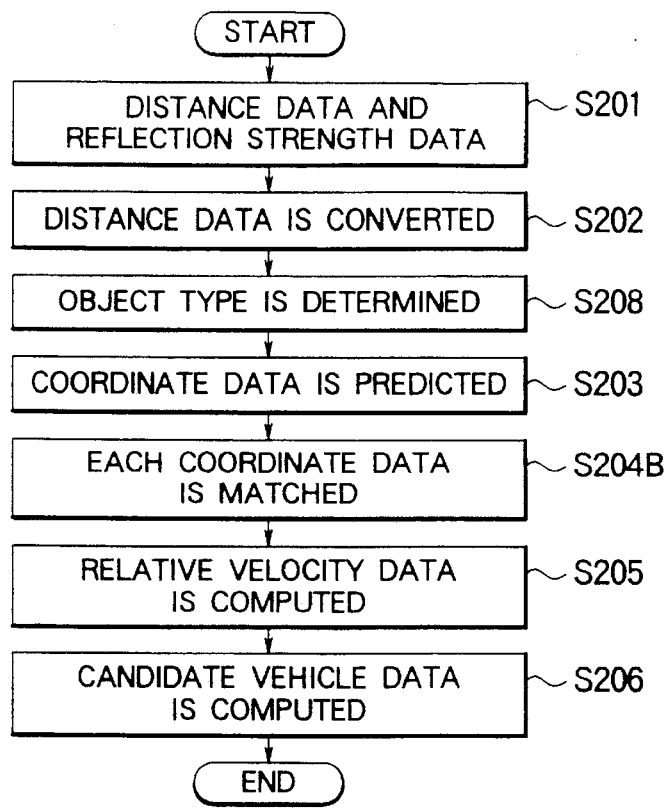
FIG. 9 is a flowchart illustrating processing of data in the third embodiment.

FIG. 8 illustrates a vehicle distance data processor constructed in accordance with a third embodiment of the present invention, which is substantially similar in construction and operation to the processor of the first embodiment, except for the provision of an object determining element 3A-2 which determines the type of an object in each detection point based on the data regarding the distance from a subject vehicle to each of the detection points and the strengths of the reflection obtained by the distance measuring element. A flowchart of processing distance data in the third embodiment is illustrated in FIG. 9. In this figure, the same processing steps as those in the first embodiment are designated at the same symbols as in FIG. 2. The processing of FIG. 9 involves the following additions and changes made in relation to the processing in the first embodiment.

Provided between Steps S202 and S203 is an additional Step S208 in which a determination is made as to the type of an object to which the distance of the subject vehicle is measured. The object determining element 3A-2 used for the determining process includes, for example, a distance data converting element 3A. In Step S208, as shown in FIG. 5, reflectors and those objects which are not reflectors are differentiated based on to what extent the strengths of their reflected electromagnetic waves depend on the distances thereto. More specifically, objects which reflect electromagnetic waves more strongly than a predetermined value which varies with the distances to the subject vehicle based on Equation (13) are determined as reflectors, and those which do not are determined as "objects which are not reflectors".

$$Pth = A \times Y + B \qquad (13)$$

where Pth is the strength of reflected waves with respect to a predetermined value; Y is the Y coordinate of the detection point; and A, B are constants.

In Step S204B, the following changes are made. If the object is at a detection point inside the box 11 including a previous detection point i and, in addition, for example, if the object thereat is determined as the same type as, for example, a reflector type, detection points where a reflector is located are selected again in the current measurement. If there are a plurality of selected detection points, the one closest to the predicted position is selected, after which the i and j coordinate combination is stored. The processing steps thereafter are the same as those in the first embodiment.

According to the third embodiment, the object type is determined from the relationship between the distance and the strength of the reflected wave. Those having the same results are correlated or matched with current detection positions. Therefore, mismatching will occur less frequently, which depends on the amount of determination information available. For example, such problems as mismatching between detection points where reflectors are present and those where objects other than reflectors are present can be avoided, thus resulting in more reliable vehicle-to-vehicle distance control.

FOURTH EMBODIMENT

Figure 10:
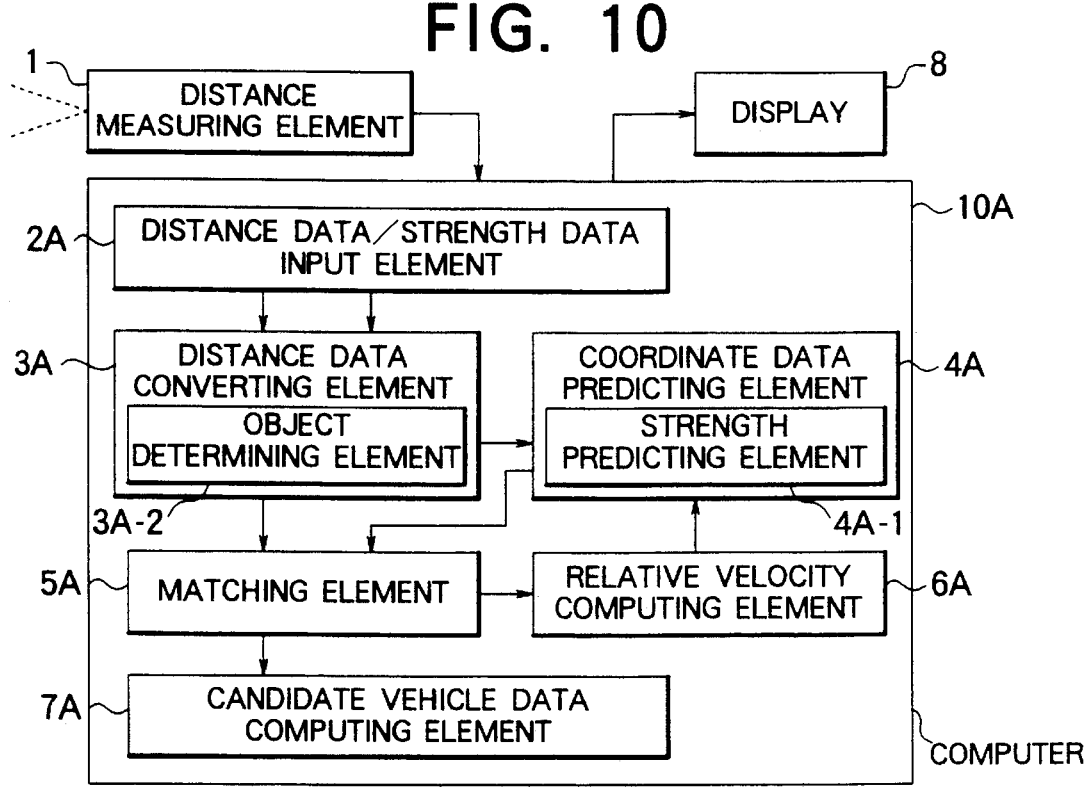
FIG. 10 is a block diagram of a vehicle distance data processor of a fourth embodiment of the invention.
Figure 13:
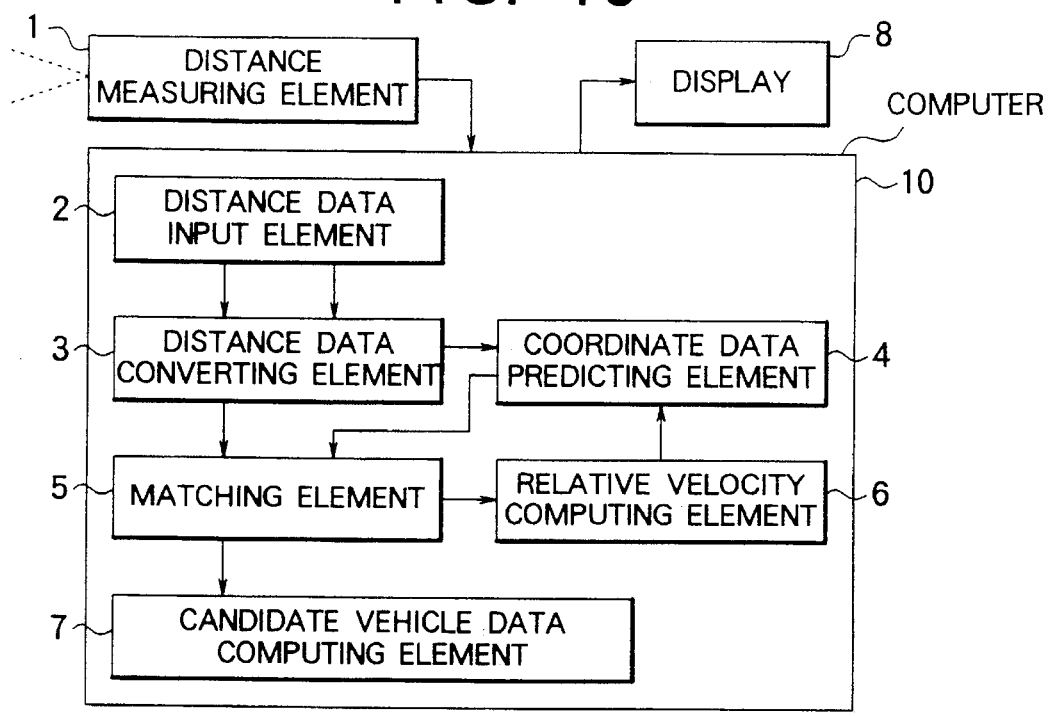
FIG. 13 is a block diagram of a conventional vehicle distance data processor.
Figure 14:
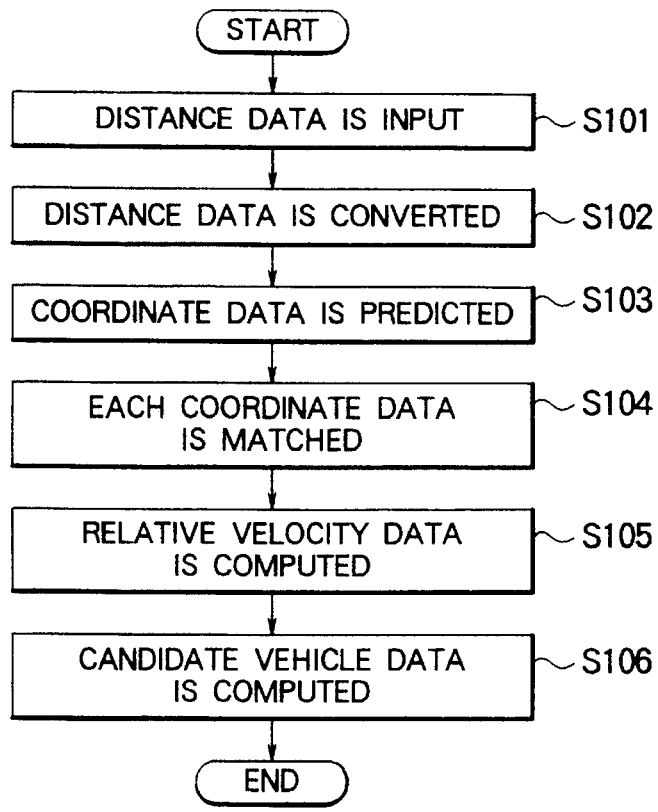
FIG. 14 is a flowchart illustrating the operation of the conventional processor.

FIG. 10 illustrates a vehicle distance data processor constructed in accordance with a fourth embodiment of the present invention which is substantially similar in construction and operation to the processor of the third embodiment, except for the provision of a reflection strength predicting element 4A-1 which predicts the strength of reflected electromagnetic waves at each currently obtained detection point based on the strength of reflected electromagnetic wave at each previously obtained detection point and relative velocity vector data related to each detection point. FIG. 11 illustrates a flowchart for processing of data in the fourth embodiment. In this figure, the same processing steps as those in the first embodiment are designated at the same symbols as in FIG. 2. The processing of FIG. 11 involves the following additions and changes made in relation to the first embodiment.

In the first through third embodiments, in Step S203, the current coordinates are predicted based on past coordinates and relative velocity vector data. In the fourth embodiment, however, an additional step is carried out based on the determination of the type of an object made in Step S208 in the third embodiment. Specifically, in Step S209, a determination is made as to whether or not variations in the reflection strength with distance closely approximates the variations represented by the curve in FIG. 5. In accordance with this curve, based on a change or difference between the previous and current measured distances, the strength of the reflected waves and the coordinates are predicted.

In Step S204C, the following processing is carried out. After the current detection point j has been searched for in the box enclosing the previous detection point i, the detection point having a reflection strength closest to the predicted value is selected. Then, the i and j coordinate combination is stored. The rest of the processing steps are the same as those in the first embodiment.

According to the fourth embodiment, the type of an object is determined, and based on this result, changes in the reflection strength are predicted and the detection points having the same time series are correlated or matched. Thus, for example, mismatching will not be made between detection points where reflectors are present and those where objects other than reflectors are present, whereby more reliable vehicle-to-vehicle distance control can be achieved.

FIFTH EMBODIMENT

FIG. 12 illustrates a vehicle distance data processor constructed in accordance with a fifth embodiment of the present invention, which is substantially similar in construction and operation to the processor of the first embodiment, except for the provision of a grouping element 3A-3. The grouping element 3A-3 arranges coordinate data to form a group of closely located coordinates and provides the representative coordinate data and representative reflection strength of the group. In the first through fourth embodiments, data processing was carried out using the coordinates and reflection strength of each detection point, but in the fifth embodiment, those detection points which are located close-by are first dealt with. Then, the detection points which satisfy the following Relationships (14) and (15) are arranged into groups, and the detection points of each group are stored.

$$|Xi - Xj| \leq Xg \qquad (14)$$

$$|Yi - Yj| \leq Yg \qquad (15)$$

where Xi and Yi represent coordinates of the detection point being dealt with; Xj and Yj represent coordinates of detection points other than those which are being dealt with.

The following Equations (16), (17) and (18) are used to obtain the representative coordinates and the representative reflection strength for each group of detection points.

$$Xgi = (XL + XR)/2 \qquad (16)$$

$$Ygi = min(Yi) \qquad (17)$$

$$Pgi = max(Pi) \qquad (18)$$

where Xgi and Ygi designate the representative coordinates of a first group; Pgi represents the typical reflection strength of the first group; and XL and XR respectively represent the X coordinates of the leftmost detection point and the rightmost detection point among the detection points of the first group; and min (Yi) and max (Pi) respectively represent the closest Y coordinate and the maximum strength of reflection among the detection points of the first group.

The representative coordinates and reflection strength thus obtained are used to carry out the steps which follow the aforementioned Step S203. The grouping element 3A-3 may be incorporated, for example, in the distance data converting element 3A.

According to the fifth embodiment, the detection points are grouped together so as to reduce the amount of data to be handled for high speed processing.

In the above-described embodiments, the functions or operations of the distance data converting element 3A, the coordinate data predicting element 4A, the correlating or matching element 5A, the relative velocity computing element 6A, the candidate vehicle data computing element 7A, the reflection strength order determining element 3A-1, the object determining element 3A-2, the reflection strength predicting element 4A-1, and the grouping element 3A-3 are performed through software by means of the computer 10A. However, it should be understood that the functions thereof can be performed through hardware such as electric circuits in a similar manner as the software is executed.

What is claimed is:

1. A vehicle distance data processor comprising:

distance measuring means which generates electromagnetic waves in a plurality of directions and receives electromagnetic waves reflected from objects to provide reflection strength data regarding the strengths of the reflected electromagnetic waves and distances to the objects;

distance data converting means for converting distance data obtained by said distance measuring means into coordinate data of the positions of the points of detection;

predicting means for predicting coordinate data of each currently obtained detection point based on the coordinate data of each previously obtained detection point and relative velocity vector data related to each detection point;

matching means for matching each previously obtained detection point and each currently obtained detection point in a time serial manner, based on the predicted coordinate data obtained by said predicting means, the strength of the reflected electromagnetic waves of each previously obtained detection point, and the coordinate data of each currently obtained detection point and the strength of reflected electromagnetic waves thereat;

relative velocity computing means which computes the relative velocity vector data based on the detection points which have been matched with their respective points by said matching means, with the computed relative velocity vector data being used in said predicting means; and candidate vehicle data computing means for obtaining candidate vehicle data by computation of a currently obtained detection point based on the coordinate data of each currently obtained detection point and relative velocity vector data, to obtain coordinate data and velocity vector data of said currently obtained detection point.

2. A vehicle distance data processor according to claim 1 further comprising reflection strength order determining means for ordering the detection points based on the strengths of reflected electromagnetic waves obtained by said distance measuring means, wherein said matching means matches each previously obtained detection point and each currently obtained detection point in a time serial manner, based on the predicted coordinate data predicted from each previously obtained detection point, the strength of reflected electromagnetic waves at each previously obtained detection point, and the order of the detection points arranged according to the reflection strengths thereof, the coordinate data of each currently obtained detection point, the strength of reflected electromagnetic waves at each currently obtained detection point, and the order of the detection points according to the reflection strengths thereof.

3. A vehicle distance data processor according to claim 1 further comprising object determining means for determining the type of an object at each detection point based on distance data of a distance to each of the detection points and reflection strengths obtained by said distance measuring means, wherein said matching means matches each currently obtained detection point and each previously obtained detection point in a time serial manner, based on the predicted coordinate data predicted from each previously obtained detection point, results of previous determinations obtained by said object determining means, coordinate data of each currently obtained detection point, and current determinations obtained by said object determining means.

4. A vehicle distance data processor according to claim 3 further comprising strength predicting means for predicting the strength of reflected electromagnetic waves at each currently obtained detection point, based on the strength of reflected electromagnetic waves at each currently obtained detection point and relative velocity vector data related to each detection point, wherein said matching means matches each previously obtained detection point and each currently obtained detection point in a time serial manner, based on the predicted coordinate data predicted from each previously obtained detection point, the predicted strength of reflected electromagnetic waves obtained by said reflection strength predicting means, the coordinate data of each currently obtained detection point, and the reflection strengths thereat.

5. A vehicle distance data processor according to claim 1 further comprising grouping means which arranges coordinate data into groups of closely located detection points to obtain representative coordinate data and a representative strength of reflected magnetic waves of the group, wherein the representative coordinate data and the representative strength of reflection are used as the coordinate data and the reflection strength, respectively, of each detection point.

6. A vehicle distance data processor as claimed in claim 1, wherein the matching means determines matching between the currently obtained detection points and the previously obtained detection points by comparing the coordinate data of the currently obtained detection points to the predicted coordinate data obtained by said predicting means, and comparing the strength of the reflected electromagnetic waves of each previously obtained detection point to the strengths of reflected electromagnetic waves of the currently obtained detection points.

* * * * *